US008966614B2

(12) United States Patent
Thorpe et al.

(10) Patent No.: US 8,966,614 B2
(45) Date of Patent: Feb. 24, 2015

(54) SYSTEMS, METHODS, AND COMPUTER PROGRAM PRODUCTS FOR PROVIDING VIDEO-PASSWORDS FOR USER AUTHENTICATION

(71) Applicant: University of Ontario Institute of Technology, Oshawa (CA)

(72) Inventors: Julie Katherine Thorpe, Whitby (CA); Amirali Salehi-Abari, Whitby (CA); Robert Eric Burden, Gormley (CA)

(*) Notice: Subject to any disclaimer, the term of this patent is extended or adjusted under 35 U.S.C. 154(b) by 77 days.

(21) Appl. No.: 13/906,872

(22) Filed: May 31, 2013

(65) Prior Publication Data

US 2014/0359653 A1    Dec. 4, 2014

(51) Int. Cl.
*G06F 21/00* (2013.01)
*H04N 21/441* (2011.01)

(52) U.S. Cl.
CPC .............. *H04N 21/441* (2013.01); *G06F 21/00* (2013.01)
USPC ........................................................ 726/17

(58) Field of Classification Search
CPC combination set(s) only.
See application file for complete search history.

(56) References Cited

U.S. PATENT DOCUMENTS

| 5,559,961 | A  | 9/1996 | Blonder |
| 8,117,458 | B2 | 2/2012 | Osborn, Iii et al. |
| 2006/0130151 | A1* | 6/2006 | Wu .................................. 726/29 |
| 2012/0159609 | A1  | 6/2012 | Griffin et al. |
| 2014/0289818 | A1* | 9/2014 | Yahata et al. ..................... 726/4 |

FOREIGN PATENT DOCUMENTS

EP        2523137        11/2012

OTHER PUBLICATIONS

Thorpe, Salehi-Abari and Burden. Video-Passwords: Advertising while Authenticating. Bertinoro, Italy. Sep. 18-21, 2012.

* cited by examiner

*Primary Examiner* — Beemnet Dada

(57) ABSTRACT

This invention is related to authentication schemes utilizing advertising video-passwords, which require the user to watch and remember parts of a given advertisement video. Different embodiments of the invention can utilize just time reference point information, or can optionally include grid element, click point, tag phrase, or a combination of both click point and tag phrase information. A reference video-password is defined based on the time reference point information, and optionally with grid element, click point, or tag phrase information. Subsequently, the user will attempt authentication and the candidate video-password will be defined with the associated time reference point determined from the user's input, and optionally with grid element, click point, or tag phrase information received from the user. The system would then authenticate the user based on the comparison result between the reference video-password and the candidate video-password.

20 Claims, 12 Drawing Sheets

SYSTEMS, METHODS, AND COMPUTER PROGRAM PRODUCTS FOR PROVIDING VIDEO-PASSWORDS FOR USER AUTHENTICATION

FIELD

The present invention relates to authentication schemes related to video-passwords.

SUMMARY

In accordance with an aspect of the invention, there is provided a method for authenticating a user of a computer system. The method comprises: (a) displaying an advertisement video to the user, wherein the advertisement video defines a video time duration and comprises a sequence of video frames during the video time duration; (b) defining a reference video-password by receiving from the user n time reference points, n being a positive integer, and recording the n time reference points in a memory of the computer system, each time reference point having a one-to-one relationship with a single video frame in the advertisement video, wherein the time reference point indicates the relative position within the video time duration of the video frame in the sequence of video frames; and (c) subsequently authenticating the user by (i) displaying the advertisement video on a display for viewing by the user; (ii) receiving from the user m inputs during (i), m being a positive integer, wherein each input is entered by the user through an input device; (iii) determining m input time reference points, by determining, for each of the m inputs an associated time reference point that is substantially equal to the time reference point of the video frame that is on the display when the user enters the input; (iv) defining a candidate video-password by recording the m input reference points determined in (iii) in the memory; (v) using a processor of the computer system to determine if the candidate video-password matches the reference video-password by determining if the number of time reference points of the reference video-password is equal to the number of input time reference points of the candidate video-password and each of the time reference points of the reference video-password is within a pre-defined time tolerance interval of the corresponding input time reference point of the candidate video-password; and (vi) authenticating the user if and only if the candidate video-password matches the reference video-password, and otherwise indicating failed authentication.

In accordance with an aspect of the invention, there is provided a system for authenticating a user, the system comprising: a processor unit; and a recording medium having instructions stored thereon for configuring the processor to perform the steps of: a) displaying an advertisement video to the user, wherein the advertisement video defines a video time duration vector and comprises a sequence of video frames during the video time duration vector; b) defining a reference video-password by receiving from the user n time reference points, n being a positive integer, and recording the n time reference points in a memory of the system, wherein each time reference point indicates a relative position within the video time duration vector; c) subsequently authenticating the user by i) displaying the advertisement video on a display for viewing by the user; ii) receiving from the user m inputs during (i), m being a positive integer, wherein each input is entered by the user through an input device; iii) determining m input time reference points, by determining, for each of the m inputs an associated time reference point that is related to the time reference point of the video frame that is on the display when the user enters the input; iv) defining a candidate video-password by recording the m input time reference points determined in (iii) in the memory; v) determining if the candidate video-password matches the reference video-password by determining if the number of time reference points of the reference video-password is equal to the number of input time reference points of the candidate video-password and each of the time reference points of the reference video-password is within a pre-defined time tolerance interval of the corresponding input time reference point of the candidate video-password; and vi) authenticating the user if and only if the candidate video-password matches the reference video-password, and otherwise indicating failed authentication.

In accordance with an aspect of the invention, there is provided a computer program product for use on a computer system for authenticating a user. The computer program product comprises a non-transitory recording medium, instructions recorded on the non-transitory recording medium for instructing the computer system, the instructions for: a) displaying an advertisement video to the user, wherein the advertisement video defines a video time duration vector and comprises a sequence of video frames during the video time duration vector; b) defining a reference video-password by receiving from the user n time reference points, n being a positive integer, and recording the n time reference points in a memory of the system, wherein each time reference point indicates a relative position within the video time duration vector; c) subsequently authenticating the user by i) displaying the advertisement video on a display for viewing by the user; ii) receiving from the user m inputs during (i), m being a positive integer, wherein each input is entered by the user through an input device; iii) determining m input time reference points, by determining, for each of the m inputs an associated time reference point that is related to the time reference point of the video frame that is on the display when the user enters the input; iv) defining a candidate video-password by recording the m input time reference points determined in (iii) in the memory; v) determining if the candidate video-password matches the reference video-password by determining if the number of time reference points of the reference video-password is equal to the number of input time reference points of the candidate video-password and each of the time reference points of the reference video-password is within a pre-defined time tolerance interval of the corresponding input time reference point of the candidate video-password; and vi) authenticating the user if and only if the candidate video-password matches the reference video-password, and otherwise indicating failed authentication.

DRAWINGS

Several embodiments of the present invention will now be described in detail with reference to the drawings, in which.

Figure 1:
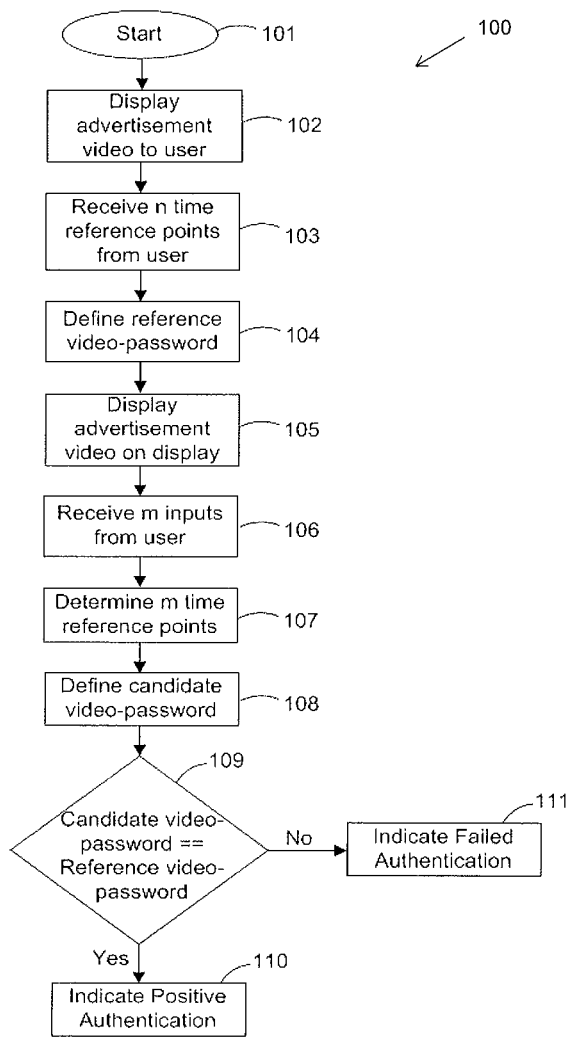
FIG. 1 is a flowchart illustrating the process of authenticating a user with a timeline video-password, in accordance with an example embodiment.

The drawings, described above, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. It will be appreciated that for simplicity and clarity of illustration, where considered appropriate, reference numerals may be repeated among the figures to indicate corresponding or analogous elements or steps.

DESCRIPTION OF VARIOUS EMBODIMENTS

The embodiments of the systems, processes and methods described herein may be implemented in hardware or software, or a combination of both. Alternatively, these embodiments may also be implemented in computer programs executed on programmable computers each comprising at least one processor (e.g., a microprocessor), a data storage system (including volatile and non-volatile memory and/or storage elements), at least one input device, and at least one output device. For example and without limitation, the programmable computers (referred to below as computing devices) may be a personal computer, laptop, personal data assistant, cellular telephone, smart-phone device, tablet computer, and/or wireless device. For any software components, program code is applied to input data to perform the functions described herein and generate output information. The output information is applied to one or more output devices, in known fashion.

Each software component or program may be implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, this description and the drawings are not to be considered as limiting the scope of the embodiments described herein in any way, but rather as merely describing the implementation of the various embodiments described herein.

1. ORGANIZATION OF CONTENT

Traditional text passwords have well-known shortcomings, such as vulnerability to being guessed by attackers [36] and memorability issues [1] that lead to password re-use across accounts [18]. Password policies continue to become more strict, leading to other usability issues [20]. These weaknesses have motivated many new alternatives to passwords, with the goal of improved security and usability. Of these, some biometrics [21] and physical tokens [30] appear to have very good security and usability properties, but for various reasons, including the cost of deployment, text passwords remain much more popular [19]. When cost is a reason that keeps organizations from adopting an alternative scheme to replace text passwords, we suggest that the adoption of a new scheme, advertising video-passwords, may be more likely in the presence of monetary incentives.

In this description, we propose and analyze video-passwords, which use rich multimedia in the authentication process. The goal is to make use of the rich information of multimedia to provide stronger "cues" for the user's memory, which may help users create strong passwords. Human memory has been shown to have stronger performance when aided by "cues" such as images and words [34]; richer multimedia cues such as video scenes, video movement, and audio sounds may help similarly. This motivates us to propose video-passwords.

Video-passwords require a user to select parts of a video as his or her password. The scenes, movement, and sounds in a video work as cues for particular parts of a video. For example, a video-based password scheme could require the user to remember a sequence of times on a particular video, cued by particular audio sounds or visual scenes that occur at those times. These times could be used alone (see Section 4.2), or combined with other types of information. Examples of other types of information that can be used in video-passwords include visual-spatial (see Section 4.3) and textual (see Section 4.4). In all cases, the distinguishing elements of a video-password from any other knowledge-based authentication method is that video-passwords present a video to the user, from which audio and visual cues are used upon setting a "video-password". Upon subsequent logins, these cues are involved in helping the user recall his or her "video-password". In a video-password scheme, the video itself is an integral part of the login process. We provide a formal definition of video-passwords in Section 2.

We propose four different video-password schemes in Section 4. The specifics of what is stored and checked as a video-password is highly dependent upon the scheme; e.g., one of our schemes (Timeline Video-Passwords) use only a set of times recorded (i.e., timestamps or time reference points) along the video duration timeline as the password, another (Click-Based Video-Passwords) includes selecting visual (x,y) coordinates on a user's chosen scene in a video, and another two (Tagged Video-Passwords and Tagged-Click Video-Passwords) involve "tagging" a part of the video at a user-chosen timestamp. We discuss these schemes in further detail in Section 4.

We analyze our proposed video-password schemes in terms of their theoretical security and also provide other security estimates. Two of our schemes (Click-Based Video-Passwords and Tagged-Click Video-Passwords) may have sufficient theoretical security under reasonable parameters to offer a possible replacement for traditional text passwords; Timeline Video-Passwords may have the potential to be a replacement for PIN numbers.

Our Contributions.

We propose specific video-password schemes, discuss some relevant usability challenges, analyze the theoretical security (and also some more reasonable estimates), and consider practical issues to consider in deployment. Additionally, this description introduces the idea of advertising while authenticating using schemes that involve rich multimedia.

The proposals, ideas, and theoretical analyses we describe point towards a number of interesting directions for further exploration, each of which will require a thorough investigation. These directions include evaluating the usability of each video-password scheme and the security impact of "hot-scenes" (video scenes that are more popular than others); these evaluations will provide context regarding appropriate parameters and environments for video-password schemes. These directions also include investigating how to best design video advertisements (or other videos) that do not weaken the security or usability of the system. Of course, video-passwords could be used with other types of videos that might be useful for other purposes (e.g., for educational purposes).

The remainder of this description is organized as follows. We define video-passwords more precisely in Section 2 and discuss related work in Section 3. In Section 4, we discuss four video-password schemes that we call Timeline Video-passwords (Section 4.2), Click-Based Video-passwords (Section 4.3), Tagged Video-passwords (Section 4.4), and Tagged-Click Video-passwords (Section 4.5). We analyze the security of these four schemes in Section 5 and discuss some implementation challenges in Section 6. We begin the broader discussion of advertising while authenticating in Section 7, and end with concluding remarks in Section 8.

2. DEFINING VIDEO-PASSWORDS

Video-passwords are a new class of knowledge-based authentication mechanisms that require a user u to watch a video $v_u$ and remember parts of a video. There are many possible video-password schemes that belong to this class, which use different types of information (e.g., timestamps, text, click-points, and drawings) as part of a user's authentication secret. In other words, a particular video-password scheme (e.g., Click-Based Video-Passwords) requires a user u to remember some specific types of information (e.g., times-tamps and click-points) cued by video $v_u$. In this Section, we first review these types of information, and then use these types to define video-passwords.

The types of information that can be used in video-passwords, include:

1. Timestamp information. If we view a video as a timeline, there are many possible timestamps t along this timeline at which different scenes, sounds, and movements occur. Each timestamp can be chosen as a part of the user's secret. More precisely, each timestamp t∈T, where T is the set of all possible timestamps. This information type is required for a scheme to be considered a video-password scheme; all others explained below are optional.

2. Text information. Typed text information can be used in a video-password scheme, e.g., by "tagging" parts of the video with one or two words or sentences. Each tag is a string that contains one or more words, and the number of words used will likely be related to the policies of the particular scheme using this information type. We denote the set of all possible tags by S. This information type is analogous to a password or passphrase [23].

3. Click-point information. Click-points are (x,y) coordinates within the video screen that a user clicks on with a mouse, or touches on a touch-screen. The number of possible (x,y) coordinates is related to the resolution of the video (i.e., the width×length of the video display screen in pixels). We denote the set of all possible click-points by C. This information type has also been used in click-based graphical password schemes (e.g., PassPoints [37] and PCCP [13]).

4. Drawing/gesture information. Drawings (sometimes referred to as gestures [32]) can be added as yet another information type. Drawings could be made on a part of a paused video, using a grid overlaid on the still image. Thus, this information type can be recorded as the sequence of grid cells that the drawing passes through. We denote the set of all possible drawings by D. Using drawing information for authentication has also been proposed on a background grid for an earlier scheme called Draw-A-Secret [22] and on a background image in another scheme called Back-ground Draw-A-Secret [17].

Figure 4:
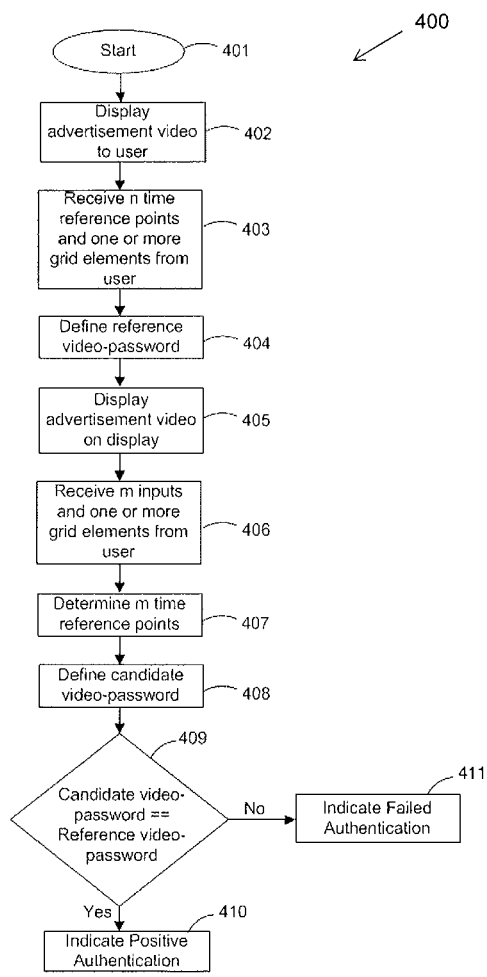
FIG. 4 is a flowchart illustrating the process of authenticating a user with a grid element video-password, in accordance with an example embodiment.

One possible embodiment with drawing/gesture information is seen in FIG. 4. Process 400 begins at step 401 and immediately proceeds to step 402. In step 402, the advertisement video is displayed to the user. During the next step of the process 403, n time reference points and one or more grid elements are received from the user. While each of the grid elements are associated with one of the n time reference points, every time reference point may not have an associated grid element. A given time reference point may also have more than one grid element associated with it. Subsequently in step 404, the reference video-password can be defined as comprising these n time reference points and the associated grid elements. Subsequent to the definition of the reference video-password, the process is ready to authenticate the user into the system. In this regard, the process next proceeds to step 405 that starts to display the advertisement video to the user on a display. During the playback of the video, in step 406, m inputs and one or more associated input grid elements are received from the user. While each of the input grid elements are associated with one of the m inputs, every input may not have an associated input grid element. A given input may also have more than one input grid element associated with it. In the next step 407, an input time reference point for each of the m inputs is established. Subsequently in step 408, the candidate video-password is defined as comprising these m input time reference points and the associated grid elements. Subsequent to this step, the reference and the candidate video-passwords are compared in step 409. For example, if the number of time reference points of the reference video-password is equal to the number of input time reference points of the candidate video-password and each of the time reference points of the reference video-password is within a predefined time tolerance interval of the corresponding input time reference point of the candidate video-password, and each of the grid elements of the reference video-password has a corresponding matching grid element in the candidate video-password, the passwords can be deemed to match and positive authentication 410 would result, or otherwise can be deemed to not match and failed authentication 411 would result.

We classify a video-password scheme by the types of information it uses. The one information type that must be present in order for a scheme to be considered a video-password scheme is the timestamp information. Let I represent the Cartesian product of the sets of information types used by a particular video-password scheme. For example, I=T×C for a video-password scheme that uses both timestamps and click-points and I=T×S×C for a video-password scheme that uses timestamps, tags, and click-points. Similarly, when the video-password only uses timestamps, I=T.

Definition of Video-Passwords.

We define a video-password $P=(\omega_1, \ldots, \omega_n)$ which is a sequence of n pieces of video-related information $\omega_i$ where $\omega_i \in I$ for all $1 \leq i \leq n$. For example, in a video-password scheme that uses both timestamps and click-points, $\omega_i \in I = T \times C$. So $\omega_i = (t_i, (x_i, y_i))$ and $P=((t_1, (x_1, y_1)), \ldots, (t_n, (x_n, y_n)))$.

2.1 General Video-Password Usage Scenario

Here we describe two phases of video-password selection and login for video-passwords, in general terms. As mentioned earlier, in all video-password schemes, the timeline information is the one required information type; all other information types can be used with the timeline information in different combinations to produce different schemes.

Video-Password Selection.

A video-password is set by a user u watching a video $v_u$, which they have the ability to navigate through, pause, play, and re-play as they wish. While watching the video $v_u$, the user u can be asked to select a set of times, which is recorded as a set of timestamps $\{t_1, t_2, \ldots, t_n\}$. These timestamps can be selected and remembered based on the scene, movement, and/or sound events that occur in $v_u$ at that time. Depending on the scheme, the user may also be asked to select a set of other additional information (e.g., click-points, tags, drawings) at each time $t_i$ which together form a piece of video-related information $\omega_i$. We denote the resulting video-password that is stored and recorded as $P=(\omega_1, \ldots, \omega_n)$. For example, if the user was asked to pick a click-point and tag a word in each timestamp, we have $\omega_i=(t_i, s_i, (x_i, y_i))$ and can write the video-password as $$P=((t_1, s_1, (x_1, y_1)), \ldots, (t_n, s_n, (x_n, y_n)))$$

where $s_i$ and $(x_i, y_i)$ represent the selected (and recorded) tag and click-point at timestamp $t_i$ respectively.

Video-Password Login.

To login, a user u must watch the same video $v_u$ again, and input P', which the user can remember based on the events that occur in $v_u$ at that time. If P' is approximately equal to P, the video-password will be accepted by the system. By "approximately equal", we are referring to the need for error tolerance, denoted by $\tau$, on the timestamps that the user selects during video-password selection. More specifically, if we denote the $i^{th}$ timestamp in input P' by t'i, then t'i is acceptable by satisfying $|t'i - ti| \leq \tau$. Based on our own testing with a video-password implementation (described in Section 4.2), we suggest $\tau=0.5$. E.g., if the first timestamp $t_1=4.005$, it would be acceptable if the user re-entered t'1 between times 3.505 and 4.505. Of course, it is possible that the specific error tolerance may need to be adjusted after formal user studies with the system. Alternatively, the error tolerance interval, $\tau$, can be any value between 0.2 seconds to 2 seconds, inclusive.

In order to accomplish an error tolerance of $\tau$, and still be able to hash the password for secure storage, some form of discretization will be necessary to encode a user's timestamps. Timestamps can be discretized using a method of discretization used in another context: click-based graphical passwords [12], where instead of using a set of a 2-dimensional grids (where each grid is composed of grid cells) we are using a set of 1-dimensional timelines (where each timeline is composed of time slots).

If $\omega i$ has some other additional information besides ti in P, they must also be checked to determine that P' is approximately equal to P. We propose using the same checking methods as the authentication mechanisms that inspired these additional elements: for text information, an exact match can be performed (as in traditional text passwords), for click-point information, robust discretization [7] or centered discretization [12] can be performed (as in click-based graphical passwords), and for drawing information, a grid overlay can be used (as in Draw-A-Secret [22] and Back-ground Draw-A-Secret [17]).

3. RELATED WORK

All variations of video-passwords are a form of knowledge-based authentication, meaning that they are based solely on "what the user knows". Traditional text based passwords are, of course, the most popular form of knowledge-based authentication. It has been well-known for many years that there are problems with text-based passwords relating to their memorability and vulnerability to being guessed by an adversary [39]. Other work has recently demonstrated that the problems with text-based passwords are even worse than previously believed, in terms of vulnerability to guessing attacks [36, 8], and there is an increasing burden being placed on users by unusable password policies [20]. These continued findings of problems in traditional text-based passwords motivate our work on alternative authentication schemes such as video-passwords.

Many other alternatives to traditional text-based passwords have been proposed over the last 10-15 years. Graphical passwords is the most closely related; they make use of a single medium (images) in the authentication process, as opposed to the rich multimedia used in video-passwords. There have been many variants of graphical passwords proposed; see Biddle et al. [5] for a comprehensive survey. Although graphical passwords do not offer the same potential for advertising through authentication, we review them by some general categories and some representative schemes, drawing relationships to video-passwords where applicable and possible.

We use the graphical password schemes categorization of Biddle et al. [5]: recall-based, recognition-based, and cued-recall. These categories are sometimes called other names; De Angeli et al. [2] called these categories by the following names: drawmetric, cognometric, and locometric respectively.

Recognition-based graphical password schemes generally require the user to recognize one or more images from a larger set. This category includes PassFaces [29, 11], which requires users to recognize a set of human faces from a larger set presented. Other recognition-based schemes include Déja Vu [16], which requires the user to recognize a set of random art from a larger set presented, and Story [15], which requires the user to recognize a set of images (of people, food, and objects) from a larger set presented.

Cued-recall based graphical passwords are sometimes called "click-based" graphical passwords, as they often present the user with one or more background images, on which they click a sequence of (x,y) points. One of the first such schemes was PassPoints [37], whereby the user was presented with a single background image and asked to remember on a sequence of 5 points. Cued-recall graphical passwords have appeared commercially by PassLogix [28]. Other variants have been proposed such as PCCP [13], whereby the user clicks on each of a sequence of background images and is persuaded to choose more secure points through user interface enhancements. Our Click-Based Video-password scheme has similarities to click-based graphical passwords, in that a user asked to click on a scene in a video, which is similar to the task of clicking on an image; however clicking on a video scene records the video scene's timestamp as well as the click-point coordinate. In both video-password and graphical password cases, the user is cued by a background image (in the video-password however, there will also be a number of cues leading up the scene, which may also provide additional cues to aid the user's recall).

Drawing-based graphical passwords ask the user to create a drawing as his or her authentication secret. Examples of a drawing-based graphical password schemes include Draw-A-Secret [22] and Pass-Go [33], which ask users to draw a password on a background grid. A variation of this idea called Background Draw-A-Secret [17] displays the background grid over a still image, which appears to offer security and usability advantages. GridWord [4] is a related scheme in that it displays a grid to the user and they have the option of selecting a few grid cells as their password (it also provides the option of entering a few text-based words if the user prefers). Other drawing-based password schemes include Android phones' password pattern [3], and a variation that has appeared as an option in Windows 8 [32], which is similar to Background Draw-A-Secret (BDAS) [17] in that it asks the user to draw on the background image. As discussed in Section 2, a video-password scheme could incorporate drawings into its design, such that a user draws on a paused scene, similar to the user drawing on a back-ground image in BDAS; however, the timestamp of the scene will also be recorded in a video-password, which theoretically adds more security.

Another alternative to passwords is OBPwd [6], which re-quires a user to remember the location of a digital object (e.g., a file on the local computer or on the web); the ObPwd application hashes the object and converts it to a text password for the user to copy and use. This scheme is very interesting, but quite different than the video-passwords we propose, as even if a user decides to choose a video file as his or her OBPwd, the user does not watch the video as part of the OBPwd login process. If the user does not watch the video as part of the login process, there is no opportunity for advertising.

More loosely related work, which does not focus on authenticating individual users, includes video CAPTCHAs that aim to distinguish humans from computers. One video CAPTCHA scheme involves the user viewing a video and typing a few words that describe its content [25]. Other CAPTCHA schemes involve the user watching a video with a word moving across it, and then typing the moving word [38].

If a user performs these tasks accurately (which are difficult for computers to do), they are considered human and allowed to proceed with e.g., account creation.

4. SOME VIDEO-PASSWORD SCHEMES

As discussed in Section 2, video-passwords are a class of authentication schemes that present a video to a user, which is used by the user to recall their login information. In this section, we discuss a few initial video-password schemes. These schemes have some common usability considerations; we discuss these in Section 4.1. The first scheme we consider is the simplest form of video-passwords; it only uses timestamp information (e.g., a sequence of distinct times on the video) and thus we call it Timeline Video-passwords (Section 4.2). The second scheme we consider uses the timestamp information combined with spatial information from the visual scenes (as in click-based forms of graphical passwords); we call this variant Click-Based Video-passwords (Section 4.3). The third scheme uses the timestamp information and additionally uses a text information to tag one or more distinct times on the video timeline; we call this variant Tagged Video-passwords (Section 4.4), and the fourth scheme uses text information to tag one or more distinct click-points on the video; we call this variant Tagged-Click Video-passwords (Section 4.5). We discuss our prototype of these schemes, describe our initial designs, and discuss some usability considerations.

4.1 General Usability Considerations

Figure 8:
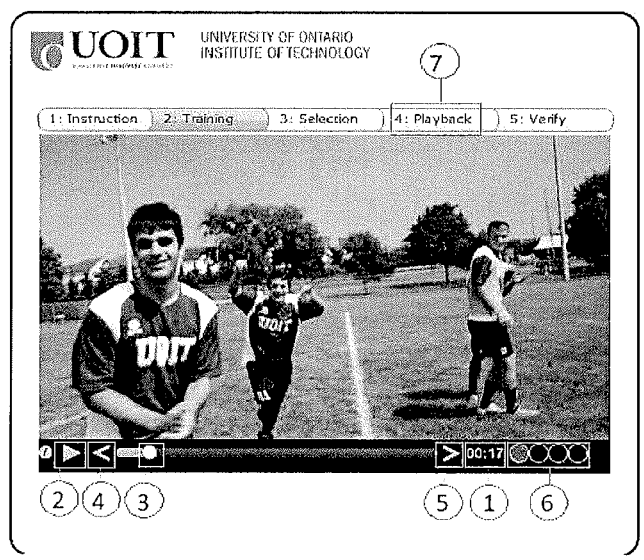
FIG. 8 is a diagram illustrating a video-password graphical user interface, in accordance with an example embodiment.

Video-passwords have a few general usability considerations, regardless of the details of the particular scheme. Each of the video-password schemes we consider have some common user interface elements, all related to the general viewing and navigation of a video. We believe the elements 1 to 7 described below may be useful for a successful user experience in any video-password scheme. Also, FIG. 8 shows an embodiment of such a video-password interface with all these elements numbered.

1. Time display. The user should be able to see how many seconds have lapsed in the video's play. For example, if the user knows that they chose all of their timestamps after the 20-second mark, they should be able to navigate to that time (through the fast timeline scroll feature described further below) and see that they have successfully navigated to the desired time.

2. Play/pause button, Videos can be fast-paced, so the user should be able to control viewing the video, and have the ability to pause it if needed. For example, if the user begins watching the video v to login, and must attend to something else for a moment, he or she should be able to pause the video and play it again when ready.

3. Fast timeline scroll, with an automatic visual update. The user should be able to quickly focus on a particular part of the video that he or she knows its approximate point in the timeline. For example, if the user knows his or her first timestamp is just after the middle of the video, this feature will allow an initial quick jump to the middle of the video.

4. Rewind button (with fine-grained control). If the user wishes to watch a particular part of the video again, they should be able to do so. For example, if the user recognizes the scene that corresponds to timestamp $t_2$ before inputting $t_1$, he or she knows that the first point was missed and should be able to rewind.

5. Fast-forward button (with fine-grained control). If the user wishes to focus on scenes of the video they know occur at a later time, they should be able to fastforward through irrelevant scenes. For example, if the user recognizes that the video was rewound too far, he or she can fast-forward to the desired scene.

6. Feedback. It is helpful for the user to have some sort of feedback that each timestamp $t_i$ has been selected and registered with the system (at least during video-password selection). We use three methods to accomplish this: (a) The "traffic lights" feature at the lower—right corner of the screen—for each $t_i$ that is recorded, a circle is filled-in and (b) we pause the video for 2 seconds to allow the user to have a moment to commit the scene to memory. Other feedback mechanisms can be added that are specific to the other elements in $\omega_i$ that are used in each scheme (e.g., see Section 4.3 for an example when $\omega_i$ contains a click-point).

7. Playback. To help the user recall his or her password P, we incorporated a video-password playback feature that occurs immediately after password selection. This will replay the video, with the feedback mechanisms specified above added-in to indicate when each timestamp $t_i$ was selected. Additional scheme-specific feedback mechanisms are also replayed in the playback feature.

4.2 Scheme 1: Timeline Video-Passwords

Timeline Video-Passwords are the most basic form of video-password in that it only makes use of the video's timeline information. As we will discuss in Section 5, the security it affords under reasonable parameters may be comparable to that of PIN numbers.

In this scheme, the user's task is to watch a short video, and choose a set of timestamps $\{t_1, t_2, \ldots, t_n\}$ on the video timeline (i.e., $\omega_i = t_i$). The user is cued by the audio sounds and video scenes/movement that occur during those times, and presses a button or any other appropriate input to input those times to the system. One can view the video as a mnemonic to help the user to recall a set of times along a timeline. See FIG. 2 for an example. The user's video-password is recorded as the set of timestamps $P = \{t_1, t_2, \ldots, t_n\}$.

Figure 9:
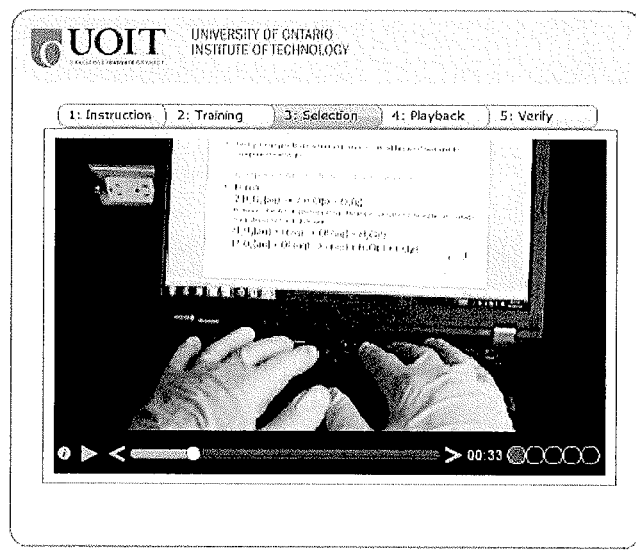
FIG. 9 is a diagram illustrating a user interacting with a timeline Video-password scheme, in accordance with an example embodiment.

FIG. 9 shows an embodiment of Timeline Video-passwords, where the user is entering $\omega 1 = t 1$. The border around the video screen is the spacebar press indicator. The border is yellow when viewed in color. The video shown is a UOIT advertisement [35].

Parameters.

In order to be comparable in terms of login time to other alternatives to text passwords (e.g., click-based graphical passwords [37, 13]), we suggest a video duration of 30 seconds. The other parameter is the number of timestamps that the user must remember along the timeline; these are distinct pieces of information, thus the more timestamps we ask a user to recall, the more difficult it should be for them to remember the password, For some embodiments, we suggest a maximum of n=4 timestamps that a user recalls in a video-password.

Specific Usability Consideration:

spacebar press indicator. It is helpful for the user to have some sort of additional feedback that their time has been selected and registered with the system. We use one additional method (on top of the general traffic light and pausing methods specified in Section 4.1 to accomplish this: we place a yellow border around the screen while it is paused to frame the scene (see FIG. 9).

One possible embodiment with just timestamp or time reference point information is seen in FIG. 1. Process 100 begins at step 101 and immediately proceeds to step 102. In step 102, the advertisement video is displayed to the user. During the next step of the process 103, n time reference points are received from the user. Subsequently in step 104, the reference video-password is defined as comprising these n time reference points. Subsequent to the definition of the reference video-password, the process is ready to authenticate the user into the system. In this regard, the process next proceeds to step 105 that starts to display the advertisement video to the user on a display. During the playback of the video, in step 106, m inputs are received from the user. In the next step 107, an input time reference point for each of the m inputs is established. Subsequently in step 108, the candidate video-password is defined as comprising these m input time reference points. Subsequent to this step, the reference and the candidate video-passwords are compared in step 109. In this embodiment, if the number of time reference points of the reference video-password is equal to the number of input time reference points of the candidate video-password and each of the time reference points of the reference video-password is within a pre-defined time tolerance interval of the corresponding input time reference point of the candidate video-password, the passwords shall be deemed to match and positive authentication 110 would result, or otherwise shall be deemed to not match and failed authentication 111 would result.

Figure 2:
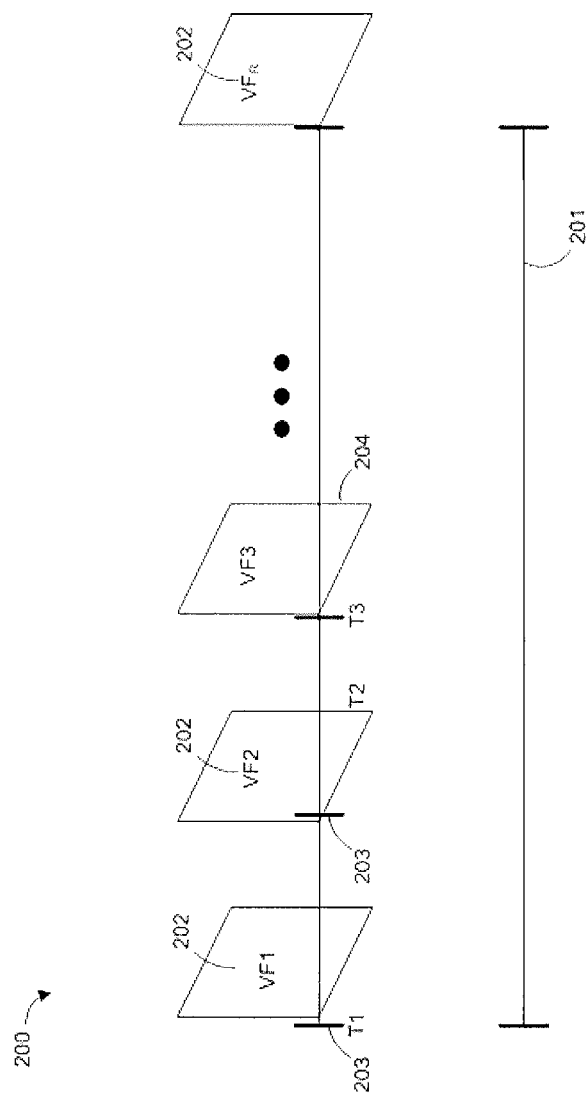
FIG. 2 is a block diagram illustrating the components of an advertisement video, in accordance with an example embodiment.

It should be noted that the time reference points in this embodiment do not need to correspond exactly with the relative location of any actual frame in the video time duration vector. For example, this may be the case if the video time duration vector is partitioned into non-overlapping time slots with representative time reference points or if any discretization of the time reference points is performed. In the embodiment seen in FIG. 2, it can be seen that the time reference points T1 and T2 (203) do not exactly overlap with the relative position of any video frame (202) in the sequence of video frames, but T3 in fact does overlap with the relative position of an actual video frame. In FIG. 2, the video time duration vector is shown by 201.

Figure 3:
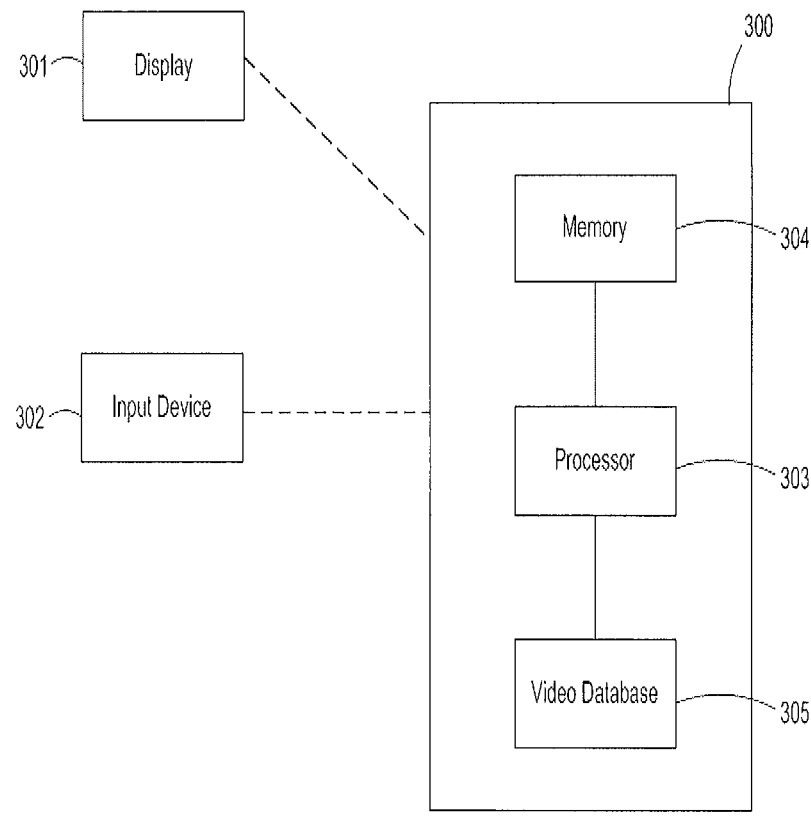
FIG. 3 is a block diagram illustrating the computing device that performs the authentication and the display and input device utilized by the user, in accordance with an example embodiment.

FIG. 3 shows a top-level view of an embodiment of this invention, where the user sees the video on the display 301 and uses input device 302 to enter the input. 301 and 302 are in communication with the computing device 300 that determines the authentication. In this computing device, the candidate and reference video-passwords are stored in the memory 304 and the two passwords are compared by the processor 303. The advertisement video that is shown to the user is stored in the video database and is retrieved to be presented to the user. The video database may also be an external database to the computing device 300.

The computing device 300 can generally be any electronic device capable of network communication. For example, and without limitation, the computing device 300 can be a server, personal computer, laptop, personal data assistant, cellular telephone, smart-phone device, tablet computer, wireless device, and/or kiosk. The computing device 300 can include one or more components or modules that operate based on software and/or hardware. For example, the computing device 300 can include a device processor, a device storage component and a device interface component. The device processor can generate a request for access to resources available remotely from the computing device 300 and/or a request to change an access level for a user, a group of users or a resource.

Resources available to the computing device 300 can include one or more software applications and/or hardware components. These resources can be stored remotely from the computing device 300. These resources can be provided to the computing device 300 via the client interface component. The client interface component can provide a communication interface for receiving and/or transmitting data with external components and/or other devices (e.g., via a USB connection, serial port connection, parallel port connection, HDMI port connection, radio-frequency connection, Bluetooth™ connection, a wireless connection, a mobile network connection, audio data connection, video data connection and any other data connections).

The software applications can include computer programs that can provide functionality of the computing device 300 or enable functionality of the computing device 300. The software applications can also operate with or enable the hardware components to provide functionality to the computing device 300. For example, the software applications can include, without limitations, e-mail client applications, messaging applications, social networking applications and/or gaming applications.

The hardware components can include any physical components or devices that can be available for use by the computing device 300. For example, the hardware components can include a storage component (e.g., a hard disk drive, a random-access memory, and/or other computer data storage components), a navigation component (e.g., a Global Positioning System (GPS)), a multimedia component (e.g., a sound card, a video card, etc.), one or more user interface components (e.g., a touch screen, a keyboard, a display, etc.), and/or other components for providing additional functionalities to the computing device 300 (e.g., a motion detection module including a Gyroscope, etc.).

4.3 Scheme 2: Click-Based Video-Passwords

Figure 10:
FIG. 10 is a diagram illustrating a mouse cursor animation that enhances visualization of the user input, in accordance with an example embodiment.

In Click-Based Video-passwords, the user clicks (or touches, if the user has a touch screen), a point $(x_i, y_i)$ in a particular scene at time $t_i$. In this scheme, $\omega_i = (t_i, (x_i, y_i))$, so the video-password is $P = \{(t_1, (x_1, y_1)), \ldots, (t_n, (x_n, y_n))\}$. This scheme requires a number of additional user interface considerations to make the system more usable. Please see 1 to 3 below:

1. Multi-coloured mouse cursor. We observed that a regular mouse cursor does not stand out enough over a fast-paced video, and that some changes greatly increased its visibility. We modified it to be yellow, round, and slightly larger than a traditional mouse cursor. To allow it to still stand out in areas where the background is yellow (or close to yellow) we set the center of the cursor to be black. A black and white illustration of this embodiment can be seen in FIG. 10. The yellow halo (illustrated in light grey) expands like a ripple when a rock is thrown in water, then shrinks back after reaching its maximum size. The mouse cursor looks like the click indicator at its smallest phase.

2. Click-indicator. The click indicator provides feedback to the user regarding which point was registered by the system. We kept the feedback mechanism of pausing the video for 2 seconds, and added a "ripple-like" click-indicator, which grows like a ripple when a rock is thrown in water, but then shrinks back down after reaching its maximum size. See FIG. 10 for a diagram showing the different phases of the click-indicator.

3. User recommendations. We observed that in our own preliminary use of Click-Based Video-passwords, the usability was strongly affected by the video used. For slow-paced videos, it was easy to create a password; however, when the video is fast-paced (i.e., containing many rapidly changing scenes), we needed to pause the video to select a time t before selecting an (x,y) click-point. For any fast-paced video, we suggest recommending this sequence of actions to the users of the system. To facilitate this recommendation, we made pausing the video easier; pressing the spacebar is a shortcut to pause the video (note that this could be any action such as the first tap on the interface in a touch-screen environment), and the video will resume once the user has selected a click-point.

Figure 11:
FIG. 11 is a diagram illustrating an example of a password created using click-based video-password scheme, in accordance with an example embodiment.

FIG. 11 shows an example of a password created using Click-Based Video-passwords. In this scheme, the password shown is $$P = \{(t_1, (x_1, y_1)), (t_2, (x_2, y_2)), (t_3, (x_3, y_3)), (t_4, (x_4, y_4))\}$$

The yellow halos of the click-indicator were manually circled in white to make them more visible for print. These halos show the click indicator at its largest phase. The video shown is a UOIT advertisement [35].

Figure 5:
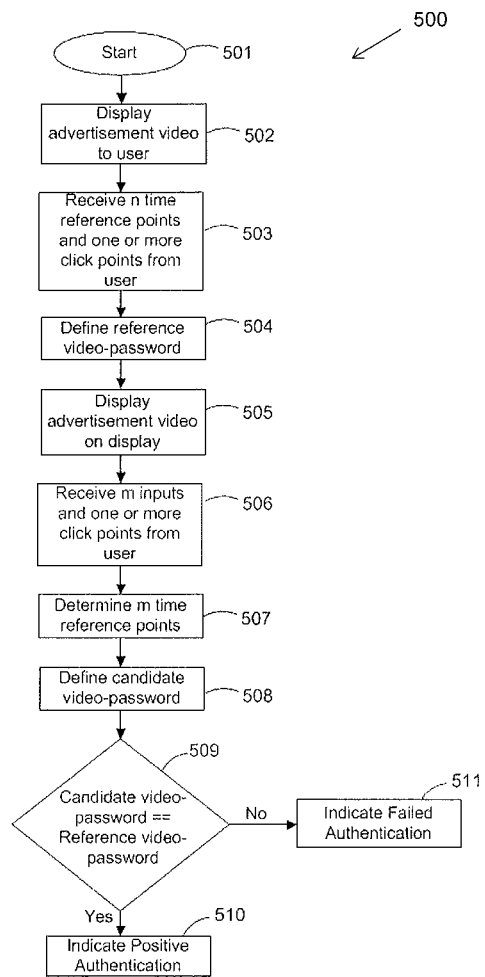
FIG. 5 is a flowchart illustrating the process of authenticating a user with a click-based video-password, in accordance with an example embodiment.

One possible embodiment with click point information is shown in FIG. 5. Process 500 begins at step 501 and immediately proceeds to step 502. In step 502, the advertisement video is displayed to the user. During the next step of the process 503, n time reference points and one or more click points are received from the user. While each of the click points are associated with one of the n time reference points, every time reference point may not have an associated click point. Subsequently in step 504, the reference video-password is defined as comprising these n time reference points and the associated click points. Subsequent to the definition of the reference video-password, the process is ready to authenticate the user into the system. In this regard, the process next proceeds to step 505 that starts to display the advertisement video to the user on a display. During the playback of the video, in step 506, m inputs and one or more associated input click points are received from the user. While each of the click points are associated with one of the m inputs, every input may not have an associated input click point. In the next step 507, an input time reference point for each of the m inputs is established. Subsequently in step 508, the candidate video-password is defined as comprising these m input time reference points and the associated click points. Subsequent to this step, the reference and the candidate video-passwords are compared in step 509. For example, if the number of time reference points of the reference video-password is equal to the number of input time reference points of the candidate video-password and each of the time reference points of the reference video-password is within a pre-defined time tolerance interval of the corresponding input time reference point of the candidate video-password, and each of the click points of the reference video-password has a corresponding matching click point in the candidate video-password, the passwords shall be deemed to match and positive authentication 510 would result, or otherwise shall be deemed to not match and failed authentication 511 would result. Here two click points may be deemed to match if they are located within a pre-defined pixel tolerance interval threshold from each other. In practice, this threshold can be between 3 pixels to 50 pixels, inclusive.

4.4 Scheme 3: Tagged Video-Passwords

Tagged Video-passwords extend Timeline Video-passwords, such that when a user presses the spacebar, he or she types $s_i$ (at least one symbol, a combination of symbols, at least one word, or a combination or words) to "tag" the scene. In this scheme, $\omega_i = (t_i, s_i)$ and the video-password is recorded as $P = \{(t_1, s_1), \ldots, (t_n, s_n)\}$.

Figure 12:
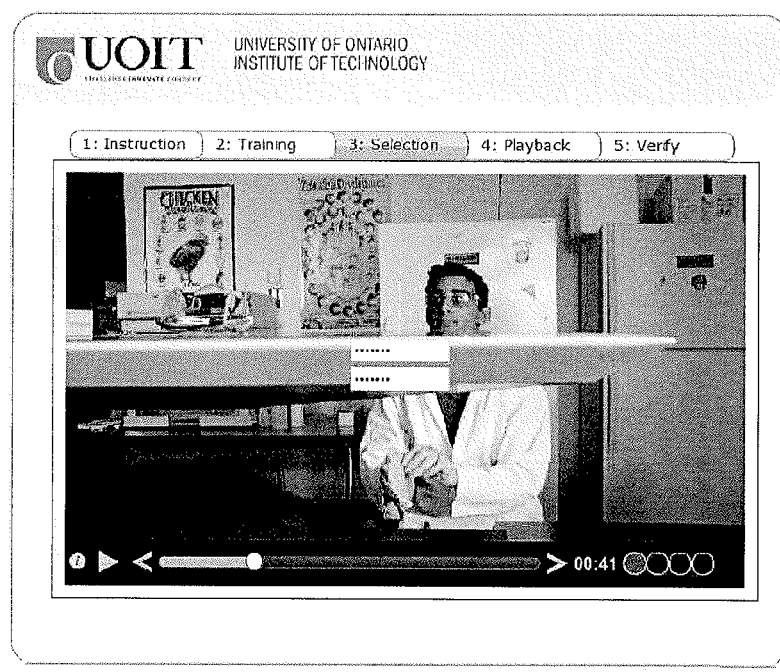
FIG. 12 is a diagram illustrating an example of a user entering a password in a tagged video-password scheme, in accordance with an example embodiment.

FIG. 12 shows an example using Tagged Video-passwords, where the user is entering $\omega_1 = (t_1, s_1)$. The video shown is a UOIT advertisement [35]. As can be seen from the figure, the user interface includes a pop-up box in the center of the screen where the user's word(s) are entered. On login, this may be replaced by circles as in a traditional text-based password scheme.

Figure 6:
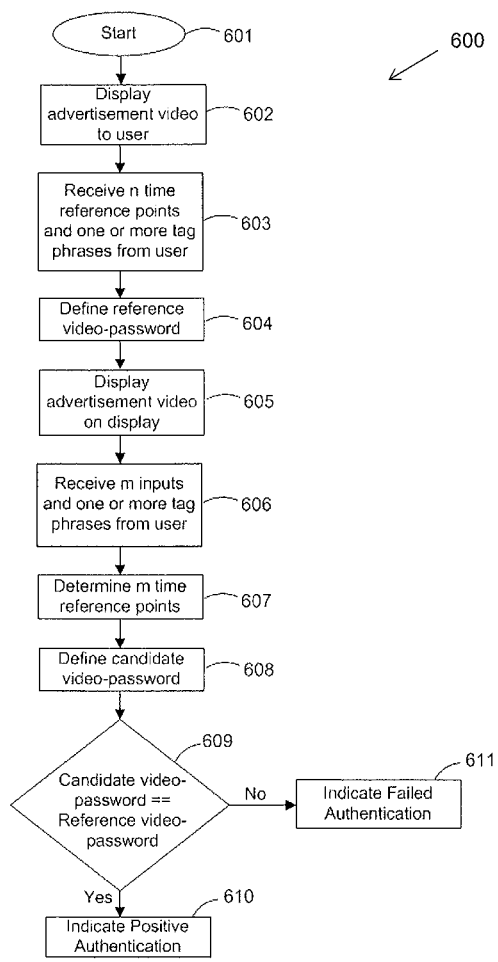
FIG. 6 is a flowchart illustrating the process of authenticating a user with a tagged video-password, in accordance with an example embodiment.

One possible embodiment with tag phrase information is seen in FIG. 6. Process 600 begins at step 601 and immediately proceeds to step 602. In step 602, the advertisement video is displayed to the user. During the next step of the process 603, n time reference points and one or more tag phrases are received from the user. While each of the tag phrases are associated with one of the n time reference points, every time reference point may not have an associated tag phrase. Subsequently in step 604, the reference video-password is defined as comprising these n time reference points and the associated tag phrases. Subsequent to the definition of the reference video-password, the process is ready to authenticate the user into the system. In this regard, the process next proceeds to step 605 that starts to display the advertisement video to the user on a display. During the playback of the video, in step 606, m inputs and one or more associated input tag phrases are received from the user. While each of the tag phrases are associated with one of the m inputs, every input may not have an associated input tag phrase. In the next step 607, an input time reference point for each of the m inputs is established. Subsequently in step 608, the candidate video-password is defined as comprising these m input time reference points and the associated tag phrases. Subsequent to this step, the reference and the candidate video-passwords are compared in step 609. For example, if the number of time reference points of the reference video-password is equal to the number of input time reference points of the candidate video-password and each of the time reference points of the reference video-password is within a pre-defined time tolerance interval of the corresponding input time reference point of the candidate video-password, and each of the tag phrases of the reference video-password has a corresponding matching tag phrase in the candidate video-password, the passwords shall be deemed to match and positive authentication 610 would result, or otherwise shall be deemed to not match and failed authentication 611 would result.

4.5 Scheme 4: Tagged-Click Video-Passwords

Tagged-Click Video-passwords combine tags with Click-Based Video-passwords, such that when a user enters a click-point, he or she types $s_i$ (a word or pair of words) to "tag" the click-point. In this scheme, $\omega_i=(t_i,(x_i,y_i),s_i)$ and the video-password is $P=\{(t_1,(x_1,y_1),s_1), \ldots, (t_n,(x_n,y_n),s_n)\}$. This scheme uses the combined user interface features of Tagged Video-passwords and Click-Based Video-passwords.

Figure 7:
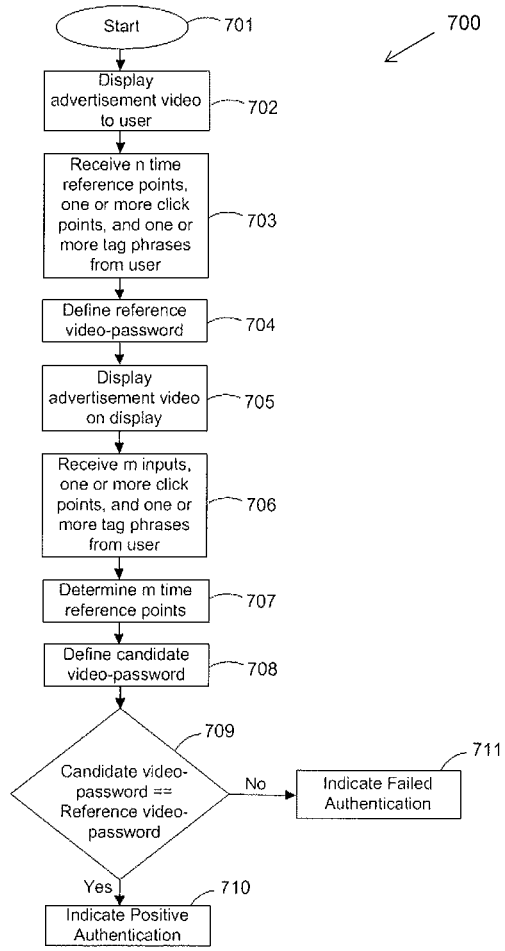
FIG. 7 is a flowchart illustrating the process of authenticating a user with a tagged-click video-password, in accordance with an example embodiment.

One possible embodiment with tag phrase information is seen in FIG. 7, and process 700 is a simple modification of either process 400 or 600. Essentially, in process 700, both tag phrase and click point information is received from the user and is considered in step 709 during the password comparison.

5. SECURITY ANALYSES

Here we analyze the theoretical size of the password space of each of the video-password schemes we present. We also analyze how different parameters may affect the security that it can offer. We show that, under certain parameters, Timeline Video-passwords can be comparable to PIN numbers. We also show that Click-Based Video-passwords and Tagged-Click Video-passwords, under certain parameters and assumptions can be comparable to traditional text passwords. Note that all of our analyses assume that users will not be allowed to choose any $\omega_i$ that overlap with each other on the video timeline; the effect is a slight underestimate of the security for video-password systems that allow overlapping $\omega_i$.

5.1 Timeline Video-Passwords

To estimate the theoretical space of video-passwords created with Timeline Video-passwords, we first consider whether it is possible for a short video to contain a sufficient number of events that can be used as a cue for a particular time in the video. To this end, we counted the number of distinct events (audio and visual) that we could detect from 4 different videos. We detail our counting results below in Table 1. In Table 2 we show our results for different values for n (the number of timestamps in T), where n≤4, for the number of events we could detect from each of the 4 videos.

TABLE 1

Counting results from 4 videos that use different camera techniques: static camera with moving objects, panning camera with static objects, and panning camera with moving objects.

| Source | Total number of cues | Number of audio cues | Number of visual cues |
|---|---|---|---|
| Sampled Video 1: New York Subway Yard | 40 | 17 | 23 |
| Sampled Video 2: Kitchen Junk Drawer | 66 | 24 | 42 |
| Sampled Video 3: Book Shelf | 65 | 25 | 40 |
| Sampled Video 4: Hot Air Balloons | 36 | 5 | 31 |

TABLE 2

Size of password space for Timeline Video-passwords. All calculations use the manually counted number of possible cues.

| Source | m (number of counted cues) | n = 2 | n = 3 | n = 4 |
|---|---|---|---|---|
| Sampled Video 1: New York Subway Yard | 40 | 780 | 9880 | 91930 |
| Sampled Video 2: Kitchen Junk Drawer | 66 | 2145 | 45760 | 720720 |
| Sampled Video 3: Book Shelf | 65 | 2080 | 43680 | 677040 |
| Sampled Video 4: Hot Air Balloons | 36 | 630 | 7140 | 58905 |

TABLE 3

Theoretical size of password space, accounting for error tolerance, for Timeline Video-passwords. These calculations assume an error tolerance of 0.5 seconds, and that events are uniformly distributed in all possible times in the entire video. All values provided are $\log_2$ of the cardinality of the password space under the specified parameters.

| Video duration | # cues* | n = 2 | n = 3 | n = 4 |
|---|---|---|---|---|
| 30-second video | 30 | 8.76 | 11.99 | 14.74 |
| 60-second video | 60 | 10.79 | 15.06 | 18.9 |
| 90-second video | 90 | 11.97 | 16.84 | 21.28 |
| 120-second video | 120 | 12.8 | 18.1 | 22.97 |
| 150-second video | 150 | 13.45 | 19.07 | 24.27 |

We use the number of counted events to determine what could be the maximum theoretical number of Timeline Video-passwords on each of these videos. We calculate this based on m (the number of counted cues) in each video, and n (the number of times the user selects). The resulting number of possible passwords is shown in Table 2, calculated by the number of combinations $C(m,n)=\binom{m}{n}$.

From Table 2, we can see that the maximum number of possible passwords we can expect is 720720 (when m=66 and n=4). This can be much more secure than a PIN number, but still may not be sufficiently secure to be a replacement for passwords.

We must also consider the security impact of allowing an error tolerance r, which is a necessity for the scheme's usability. In Table 3, we show the theoretical maximum number of distinct timeline points that can be provided when the error tolerance is 0.5 seconds (before and after each point). In a production system, the error tolerance can be achieved using timeline discretization, as discussed in Section 4.2.

In Table 3, we consider different video durations and assume a 0.5-second error tolerance (i.e., τ=0.5) to obtain a maximum number of possible cues. To obtain an upper-bound on the security that this scheme can provide, we consider that each second (on the half-second) could be selected as a distinct (non-overlapping with any other) timestamp (i.e., {0.5, 1.5, 2.5, . . . l-0.5} seconds, where l is the duration of the video in seconds).

As we can see from Table 3, if we want the scheme to be more secure than a PIN number, and we choose to keep our video at a 30-second duration, we must ask users to choose n=4 times on the video timeline. Reducing n can provide enough security if the video duration is longer, e.g., a 60-second video with n=3. For n=2, the video duration must be approximately two and a half minutes before it is comparable with a PIN number. We consider video durations that are longer than 30 seconds as it may still be usable if users make use of the fast-timeline scrollbar to quickly jump to different parts of the video.

In this analysis, we do not consider the effect of "hot-scenes" (i.e., scenes that are more popular choices than others). The effect of hot-scenes may reduce the estimates we provide in this section, but their effect should be compared to the effective security of PIN numbers when considering patterns in user choice [10]. In future work, we plan to analyze the effect of hot-scenes by conducting a user study.

5.2 Click-Based Video-Passwords

Here we analyze the security impact of adding an $(x_i, y_i)$ click-point to each $t_i$. The theoretical security that this will offer is related to the number of possible points at each time that the user is likely to choose. A video's scenes can be constantly changing, and at best, the scene will completely change each second; at worst, it will only slightly change each second. The reality is highly dependent upon the video, so here we consider a fast-paced video with many scene changes for a high estimate and a static image for a low estimate.

High Estimate

To create a realistic "upper bound" set of assumptions, we observed the first 30 seconds of a fast-paced music video [26] to determine how often the scene completely changes; we observed scene durations ranging from 0.5-2 seconds, with the majority lasting approximately 1 second, and an average scene length of 1.2 seconds. We use the simplifying assumption that no visual changes are happening in each scene (although in reality, there are a number of things changing such as people or objects moving, so this simplifying assumption should provide an underestimate regarding the number of distinct places a person may choose and recall based on an event).

We assume a video resolution of 451×331 and an error tolerance of 10 pixels in any horizontal or vertical direction, for comparison to previous studies on click-based graphical passwords [27]. We note that in our own informal testing of the system, this error tolerance of 10 pixels worked well. However, we recommend that in practice this error tolerance threshold range anywhere from 3 pixels to 50 pixels, depending on the actual embodiment.

Using these parameters, there are theoretically 395 distinct points that a user can choose, but there are likely some areas that are more popular than others (i.e., "hot-spots"). We use the estimate provided by a click-based graphical password study [27] of 111 as a more realistic number of spots on an image that a user might click.

Low Estimate

To create a lower-bound set of assumptions, when a very slow-paced video is used for Click-Based Video-passwords (i.e., a video with very few audio or video cues—we assume only one of either type of cue every 6 seconds), we use the same estimate of 111 spots on an image from a click-based graphical password study [27] that used a single background image.

Table 4 shows the results ($\log_2$) for considering high and low estimates for the number of scenes and number of distinct (x,y) points that a user can click in any given scene. The theoretical maximum is shown in the first row, showing that it can produce at most $2^{49.82}$ passwords with the assumed reasonable parameters of a 30-second duration video with a 431×331 resolution, a 10 pixel error tolerance (for each xi and yi) (this result is lower but still comparable to the $2^{52.5}$ possible 8-character passwords with special characters, numbers, and uppercase characters). Our more reasonable estimates show a range between $2^{41.6}$ passwords (for 111 possible distinct (xi,yi) points and 27 distinct scenes) and $2^{27.69}$ passwords (for the worst-case scene detail of only 10 possible distinct (xi,yi) points but 27 distinct scenes). We include the other values to show that even if we assume very few points on each scene will be chosen, with a reasonable amount of scene variation or audio cues in the video, we may still have a system with a password space of 230 possible passwords. With recent estimates of the effective security offered by text passwords (when accounting for the effect of user choice) is actually only around 20 bits [8], even under lower parameters this scheme may prove to be promising in comparison.

TABLE 4

Size of password space for Click-Based Video-passwords. The first row is the theoretical size, and the remaining rows are estimates. All values provided are $\log_2$ of the cardinality of the pass-word space under the specified parameters.

| # points | # scenes | n = 1 | n = 2 | n = 3 | n = 4 |
|---|---|---|---|---|---|
| 414 | 30 | 13.6 | 26.2 | 38.22 | 49.82 |
| 111 | 27 | 11.55 | 22.10 | 32.06 | 41.61 |
| 111 | 5 | 9.12 | 17.23 | 24.76 | 31.86 |
| 30 | 15 | 8.81 | 16.62 | 23.85 | 30.65 |
| 10 | 27 | 8.08 | 15.15 | 21.63 | 27.69 |

Our analyses herein do not consider the probability of any given time and/or (x,y) location on a video being selected by a user, as we do not have empirical estimates of such probabilities yet. We plan to study the eject of such higher-probability "hot-spots" and "hot-scenes" in our future work.

5.3 Tagged Video-Passwords

In this section, we analyze the security impact of using text information with timestamp information. The theoretical security that this may offer is related to the number of possible words at each time that the user may choose. We use the same assumptions regarding the number of possible cues that each video can have. We further assume that all tags will contain one or two lower-case dictionary words. For our estimate, we consider only the top 10% most popular dictionary words as defined in the British National Corpus (BNC) word frequency list [24]. This works out to be approximately 94000 words. In Table 5, we show results for the user choosing either one or two timestamps (i.e., n=1 or n=2) and either one or two words in each tag.

TABLE 5

Estimated password space (log₂) of Tagged Video-passwords. These calculations assume an error tolerance of 0.5 seconds (before and after), and that events are evenly distributed in all possible times in the entire video. It also assumes that at each $t_i$, the user will add a tag consisting of one or two words from a space of 94000 possible words.

| Video duration | # distinct events | n = 1, one word | n = 1, two words | n = 2, one word | n = 2, two words |
|---|---|---|---|---|---|
| 30-second video | 30 | 21.43 | 37.95 | 25.29 | 41.81 |
| 60-second video | 60 | 22.43 | 38.95 | 27.31 | 43.83 |
| 90-second video | 90 | 23.01 | 39.53 | 28.49 | 45.01 |
| 120-second video | 120 | 23.43 | 39.95 | 29.32 | 45.84 |
| 150-second video | 150 | 23.75 | 40.27 | 29.97 | 46.49 |
| 180-second video | 180 | 24.01 | 40.53 | 30.5 | 47.02 |

We consider longer-duration videos as they may prove to still be usable if users make use of the fast-timeline scroll to quickly jump to known times in the video. We highlight that the results in Table 5 assume that there are 94000 possible words that people would use in their tags. In practice, this may be an underestimate (as there are many more possible words that people could choose or create), or an overestimate (due to likely patterns in the words people choose).

The results from Table 5 may indicate that security gains are obtained by adding a tag, and mostly so when each tag contains two words—in this case, the number of possible passwords with two tags (under our assumptions and using a 3-minute long video) is $2^{47.02}$. With a 30-second video, and two tags (each containing two words), this number is $2^{41.81}$. In general, we believe that using a longer video might be possible if we train users to use the fast-scroll bar, but as with all variations we discuss, usability studies would be necessary.

5.4 Tagged-Click Video-Passwords

As discussed in Section 4.5, we could also combine tagging with Click-Based Video-passwords. We consider this using the same assumptions as in the security analysis of Click-Based Video-passwords from Section 5.2. Our results are shown in Table 6.

TABLE 6

Theoretical security analysis of Tagged-Click Video-passwords. All values provided are log₂. These calculations assume a 30-second video duration and that the tags consist of one or two words from a space of 94000 possible words.

| # (x, y) points | # scenes | n = 1, one word | n = 1, two words | n = 2, one word | n = 2, two words |
|---|---|---|---|---|---|
| 414 | 30 | 30.12 | 46.64 | 42.72 | 59.24 |
| 111 | 27 | 28.07 | 44.59 | 38.62 | 55.14 |
| 111 | 5 | 25.64 | 42.16 | 33.75 | 50.27 |
| 30 | 15 | 25.33 | 41.85 | 33.14 | 49.67 |
| 10 | 27 | 24.6 | 41.12 | 31.67 | 48.19 |

The results from Table 6's rows two and three indicate that a password space between $2^{45}$-$2^{55}$ may be feasible even with a reduced video duration of 30 seconds; a password space of this size may be feasible when we set the same tagging conditions of n=2 and two words per tag and incorporate the click-points. Under these parameters, this video-password scheme may be comparable to the theoretical security of traditional 8-character text passwords. We note that when we compare against the theoretical security of text passwords, we are comparing against the best case for text passwords; our estimates only consider 94000 possible tags. That said, we expect patterns to exist in the words that users choose/create for their tags. In the future, we plan to estimate the effective security based on user study data.

6. IMPLEMENTATION CHALLENGES

The use of video opens up new possibilities for what can be done during authentication (both from a security and user interface perspective, and an advertising perspective).

6.1 Technical Implementation Challenges

Suitable video selection will be dependent on the particular scheme's task. In order for the user to make use of the timestamp information provided in the video, it should have a sufficient (and well-distributed) number of distinct events (e.g., actions, sounds, or visual changes). This is a consideration that would ideally be solved by filtering videos for suitability, which will require user studies and research into automated video-processing and video complexity analysis.

Video Storage and Transmission.

Businesses that employ video-passwords will ideally need to store a different video for each user to complicate "human-seeded attacks" [27]. This will require additional storage space on the part of the business, who will also need to send or stream this video to the user. We suggest that this can be accomplished most efficiently by having the video sent to the user's machine once, and cached by the user's system. It may also be possible to stream the video from a third-party service to reduce overhead for individual businesses.

6.2 Policy Implementation Challenges

Most of the parameters discussed above should be incorporated into video-password policies. We review them below:

1. Video duration. There is a tension between a "more secure" video that is longer, and one that does not demand too much of a user's time. Selecting a reasonable video duration may depend on how much security the system would like to have, and how well users are educated to understand that they can quickly navigate to a certain point in the video for login.

2. Setting an appropriate value for n. A higher value of n should theoretically make the system more secure, but also puts more strain on the user's memory. Thus, we suggest a maximum of n=4, as there is evidence that the number four is considered to be a limit on the capacity of human memory [14].

3. Ensuring that system owners (and advertisers) create "good" videos. If a video has very few events of interest, it seems unlikely that a user will be able to use it to produce a strong video-password. Defining what makes a "good" video for use in a video-password will likely be dependent on the actual design of the scheme.

4. Proactive video-password checking. It is possible that some video-passwords might be common choices (e.g., having all timestamps near the start of the video); this must be determined through user studies. If such common video-passwords exist, they can be disallowed through proactive video-password checking.

6.3 Limitations

As with many other forms of authentication (e.g., graphical passwords), video-passwords will have some accessibility limitations. E.g., for people with visual impairments, the Click-Based Video-passwords scheme may not be sensible; however, the Timeline scheme could be useful, provided the video has a set of detailed and varied audio events. Similarly, people with hearing impairments may not be able to make use of the audio events in a video, but they may be able to make use of the visual scenes.

7. DISCUSSION OF ADVERTISING WHILE AUTHENTICATING

We realized that video-passwords can also be used for advertising when we were experimenting with different videos on our video-password implementations. We observed that some of the videos that were the most enjoyable to create passwords on were actually commercials, movie trailers and music videos. This leads us to realize the potential for this type of authentication to be used as a conduit for advertisement and revenue making. The real advantage of advertising while authenticating from a security perspective is that this additional revenue may help encourage organizations to adopt a video-password scheme, as opposed to the more comfortable option of sticking with traditional text passwords. The rationale is that by providing a monetary incentive, the cost and effort associated with adopting a new scheme will be worthwhile from a business perspective.

A product or service can be advertised to user u through a video $v_u$, which is presented to u during authentication. This presents a possible solution to one of the challenges in advertising—to successfully draw people's attention and awareness to the advertisement of a product, service, or person. Some surveys have indicated that most users ignore the places on web pages that they have learned contain advertisements [31]. In contrast, in our proposed video-password schemes user u may need to pay attention to all of $v_u$ at least once (during password selection), and at least some parts of $v_u$ during subsequent logins. This provides a unique opportunity for businesses to place advertisements in videos that are suitable for video-password authentication.

In videos, advertisement may be covert or overt. Overt advertising is the advertising we are normally aware of, where the purpose of the video is clearly to advertise a product or service (e.g., a commercial). Covert advertising is a different method for promoting products and services that is becoming more popular. In covert advertising, the advertisement is hidden and embedded in the media such that it is not the focal point. One of the most common covert advertising methods is placing product or brand names within videos, where the video contains some visual references to a particular product or service. For example, the use of Nokia cell phones in the movies titled "The Matrix" and "Minority Report".

We here explain different types of advertisement videos which can be used in video-password schemes:

1. Commercials. Video commercials are produced by an organization/company to overtly market a product or service. These commercials sometimes feature a song that listeners, after repeated exposure, will soon relate to the product. Commercials are usually designed to be short in length and are intended to be broadcast during television programs to increase the audience size. Commercial videos are attractive and short in length, making commercials well-suited for video-password schemes.

2. Movie Trailers. A trailer is an advertisement for a movie that is short and attractive, containing diverse scenes from the movie; these features make them suitable to be used in video-password schemes. Note that trailers can serve to advertise the movie and can also include covert advertising.

3. Music Videos. A music video is short video featuring a song and/or singer, which is intended to market a music recording. Music videos directly advertise the song and/or singer, and can also be used for covert advertising.

Possibly "hot-scenes" may occur, i.e., particular scenes in the video that are more popular than others. We expect to see some number of "hot-scenes", but the relevant question is whether their impact would render any of the given schemes insecure. For Click-based and Tagged-Click Video-passwords, whether there are "hot-spots", both dependent and independent of the scenes can be determined and video content adjusted to address any security concerns. This information can also be used by advertisers to adjust content.

For each scheme, its memorability, how long it takes for users to enter their passwords given different video durations, optimal values for n, and whether one scheme is more usable than others can all be analyzed based on usage Acceptability of different video-password parameters and video types (e.g., movie trailers, music videos, and commercials), and the usability of Timeline Video-passwords in mobile environments can also be considered.

The results of usability evaluations can provide context regarding appropriate parameters and environments for video-password schemes. For example, if studies show that under some parameters a video-password scheme has reasonable usability, memorability, and security, it could be useful as a primary login method for many systems. Alternatively, if studies show that a video-password scheme is less usable in some aspects than text passwords (e.g., having a longer login duration), it could be useful in the following environments: a password recovery scheme in place of commonly used personal knowledge questions, which appear to have questionable security [9], or a primary login method for infrequently used websites (e.g., for which users login once per week). We note that there may be other reasons for some users to find a video-password scheme useful; for example, Timeline Video-passwords may be easier to input for users who are not proficient typists, who use touch screens, or who have visual impairments (if they make use of the audio cues).

8. CONCLUSION

We introduce video-passwords, a new class of authentication schemes that require the user to watch and remember parts of a given video (e.g., a sequence of scenes, movements, and/or sounds). We propose four different video-password schemes, describe prototypes for these schemes, and analyze their security. Alongside its potential security, video-passwords provide a new opportunity for businesses to consider advertising through the rich multimedia used in the login task.

Our security analyses indicate that video-passwords have the potential to be a promising new class of knowledge-based authentication schemes. The schemes we presented and analyzed all showed differing levels of security, and required different information for a user to recall. For videos with a 30-second duration, the scheme with the strongest theoretical security may be Tagged-Click Video-passwords, which had a theoretical password space of $2^{59}$. Security estimates using more reasonable assumptions about the video and user choice may still produce between $2^{45}$ to $2^{55}$ possible passwords. For videos with a 30-second duration, the Click-Based Video-password scheme also had a theoretical password space ranging from $2^{13}$ (when one click-point is used) to $2^{49}$ (when four click-points are used). The Timeline Video-password scheme may offer over $2^{14}$ possible passwords on videos with a 30-second duration when four timestamps are selected. We have developed prototypes and plan to study the usability and effective security that these video-password schemes offer.

Video-passwords present a unique opportunity to explore the feasibility of advertising while authenticating. The monetary incentives that advertising can have may help encourage organizations and businesses to adopt video-passwords as an alternative to traditional authentication schemes, if video-password schemes are found to have reasonable security and usability in practice. Given the existing barriers of cost to adopt a new form of authentication (at least in terms of training and password resets), such incentives can play an important role. However, we believe that advertising while authenticating is a delicate subject that may have unintended consequences if it is not deployed with care. There are at least some ethical issues for advertising while authenticating; we hope to begin an open discussion of such issues through this paper.

9. REFERENCES

These are the references used in the description:
[1] A. Adams and M. A. Sasse. Users are not the Enemy. Communications of the ACM, 1999.
[2] A. De Angeli, L. Coventry, G. Johnson, and K. Renaud. Is a Picture Really Worth a Thousand Words? Exploring the Feasibility of Graphical Authentication Systems. International Journal of Human-Computer Studies, 63(1-2):128-152, 2005.
[3] A. J. Aviv, K. Gibson, E. Mossop, M. Blaze, and J. M. Smith. Smudge Attacks on Smartphone Touch Screens. In Proceedings of the 4th USENIX Conference on Offensive technologies, WOOT'10, 2010.
[4] K. Bicakci and P. C. van Oorschot. A Multi-Word Password Proposal (gridWord) and Exploring Questions about Science in Security Research and Usable Security Evaluation. In Proceedings of the New Security Paradigms Workshop (NSPW), 2011.
[5] R. Biddle, S. Chiasson, and P. C. Van Oorschot. Graphical Passwords: Learning from the First Twelve Years. ACM Computing Surveys, 44(4), 2012.
[6] R. Biddle, M. Mannan, P. C. van Oorschot, and T. Whalen. User Study, Analysis, and Usable Security of Passwords Based on Digital Objects. IEEE Transactions on Information Forensics and Security, 6(3), 2011.
[7] J. C. Birget, D. Hong, and N. Memon. Robust Discretization, with an Application to Graphical Passwords. IEEE Transactions on Information Forensics and Security, 1:395-399, 2006.
[8] J. Bonneau. The Science of Guessing: Analyzing an Anonymized Corpus of 70 Million Passwords. In 2012 IEEE Symposium on Security and Privacy, 2012.
[9] J. Bonneau, M. Just, and G. Matthews. What's in a Name? Evaluating Statistical Attacks on Personal Knowledge Questions. In Financial Cryptography and Data Security. 2010.
[10] J. Bonneau, S. Preibusch, and R. Anderson, A Birthday Present Every Eleven Wallets? The Security of Customer-Chosen Banking PINs. In FC '12: Proceedings of the 16th International Conference on Financial Cryptography, 2012.
[11] S. Brostoff and A. Sasse. Are Passfaces more usable than passwords? A field trial investigation. In Proceedings of HCI 2000, pages 405-424, 2000.
[12] S. Chiasson, J. Srinivasan, R. Biddle, and P. C. van Oorschot. Centered Discretization with Application to Graphical Passwords. In Proceedings of the 1st Conference on Usability, Psychology, and Security, UPSEC'08, pages 6:1-6:9, 2008.
[13] S. Chiasson, E. Stobert, A. Forget, R. Biddle, and P. C. van Oorschot. Persuasive Cued Click-Points: Design, Implementation, and Evaluation of a Knowledge-Based Authentication Mechanism. IEEE Transactions on Dependable and Secure Computing, 9(2):222-235, 2011.
[14] N. Cowan. The Magical Number 4 in Short-Term Memory: A Reconsideration of Mental Storage Capacity. Behavioral and Brain Sciences, 24:87-185, 2000.

[15] D. Davis, F. Monrose, and M. K. Reiter, On User Choice in Graphical Password Schemes. In USENIX Security, 2004.
[16] R. Dhamija and A. Perrig. D eja Vu: A User Study Using Images for Authentication. In Proceedings of the 9th USENIX Security Symposium, 2000.
[17] P. Dunphy and J. Yan. Do Background Images Improve Draw-A-Secret Graphical Passwords? In Proceedings of the 14th ACM Conference on Computer and Communications Security (CCS), 2007.
[18] D. Florencio and C. Herley. A Large-Scale Study of Web Password Habits. In Proceedings of the International World Wide Web Conference (WWW), 2007.
[19] C. Herley and P. C. van Oorschot. A Research Agenda Acknowledging the Persistence of Passwords. Number 10(1), pages 28-36.
[20] P. G. Inglesant and M. A. Sasse. The True Cost of Unusable Password Policies: Password Use in the Wild. In Proceedings of the 28th international conference on Human factors in computing systems, CHI '10, pages 383-392, 2010.
[21] A. Jain, L. Hong, and S. Pankanti. Biometric Identification. Communications of the ACM, 43(2):90-98, 2000.
[22] I. Jermyn, A. Mayer, F. Monrose, M. Reiter, and A. Rubin. The Design and Analysis of Graphical Passwords. In USENIX Security, 1999.
[23] M. Keith, B. Shao, and P. J. Steinbart. The Usability of Passphrases for Authentication: An Empirical Field Study. International Journal of Human-Computer Studies, 65(1): 17-28, 2007.
[24] A. Kilgarriff. BNC Database and Word Frequency Lists—Unlemmatised List "All". http://www.kilgarriff-.co.uk/bnc-readme.html#raw, last accessed August 2011.
[25] K. Kluever and R. Zanibbi. Balancing Usability and Security in a Video CAPTCHA. In Proceedings of the Symposium on Usable Privacy and Security (SOUPS), 2009.
[26] Yves Larock. Rise up, 2008.
[27] P. C. van Oorschot and J. Thorpe. Exploiting Predictability in Click-Based Graphical Passwords. Journal of Computer Security, 19(4):669-702, December 2011.
[28] Passlogix. http://www.passlogix.com, site accessed Feb. 2, 2007.
[29] Real User Corporation. About Passfaces. http://www.realuser.com, site accessed April 2012.
[30] RSA. RSA SecurID. http://www.rsa.com/node.aspx?id=1156, site accessed April 2012.
[31] Mike Sachoff. Americans Ignoring Internet Banner Ads, 2010. http://www.webpronews.com/americans-ignoring-internet-banner-ads-2010-12, site accessed April 2012.
[32] S. Sinofsky. Signing in With a Picture Password, 2011. http://blogs.msdn.com/b/b8/archive/2011/12/16/signing-in-with-a-picture-password.aspx, accessed April 2012.
[33] H. Tao and C. Adams. Pass-go: A proposal to improve the usability of graphical passwords. International Journal of Network Security, 2(7):273-292, 2008.
[34] E. Tulving and Z. Pearlstone. Availability Versus Accessibility of Information in Memory for Words. Journal of Verbal Learning and Verbal Behavior, 5:381-391, 1966.
[35] UOIT Communications and Marketing (Video Used with Permission of). Explore UOIT. http://www.uoit.ca.
[36] M. Weir, S. Aggarwal, M. Collins, and H. Stern. Testing Metrics for Password Creation Policies by Attacking Large Sets of Revealed Passwords. In Proceedings of the 17th ACM conference on Computer and Communications Security, CCS '10, pages 162-175, 2010.

[37] S. Wiedenbeck, J. Waters, J. Birget, A. Brodskiy, and N. Memon. PassPoints: Design and Longitudinal Evaluation of a Graphical Password System. Int. J. Hum.-Comput. Stud., 63(1-2):102-127, 2005.

[38] Y. Xu, G. Reynaga, S. Chiasson, J. F. Frahm, F. Monrose, and P. C. van Oorschot. Security and Usability Challenges of Moving-Object CAPTCHAs: Decoding Codewords in Motion. In 21st USENIX Security Symposium, 2012.

[39] J. Yan, A. Blackwell, R. Anderson, and A. Grant. Password Memorability and Security: Empirical Results. IEEE Security and Privacy, 2(5):25-31, 2004.

The invention claimed is:

1. A method for authenticating a user of a computer system, the method comprising:
   a) displaying an advertisement video to the user, wherein the advertisement video defines a video time duration vector and comprises a sequence of video frames during the video time duration vector;
   b) defining a reference video-password by receiving from the user n time reference points, n being a positive integer, and recording the n time reference points in a memory of the computer system, wherein each time reference point indicates a relative position within the video time duration vector;
   c) subsequently authenticating the user by
      i) displaying the advertisement video on a display for viewing by the user;
      ii) receiving from the user m inputs during (i), m being a positive integer, wherein each input is entered by the user through an input device;
      iii) determining m input time reference points, by determining, for each of the m inputs an associated time reference point that is related to the time reference point of the video frame that is on the display when the user enters the input;
      iv) defining a candidate video-password by recording the m input time reference points determined in (iii) in the memory;
      v) using a processor of the computer system to determine if the candidate video-password matches the reference video-password by
         determining if the number of time reference points of the reference video-password is equal to the number of input time reference points of the candidate video-password and each of the time reference points of the reference video-password is within a pre-defined time tolerance interval of the corresponding input time reference point of the candidate video-password; and
      vi) authenticating the user if and only if the candidate video-password matches the reference video-password, and otherwise indicating failed authentication.

2. The method as defined in claim 1 wherein the pre-defined time tolerance interval is between 0.2 seconds to 2 seconds, inclusive.

3. The method as defined in claim 1, wherein the advertisement video further comprises a video location grid defining a plurality of grid elements, and the method further comprises:
   further defining the reference video-password by receiving from the user n sets of grid elements, the n sets of grid elements including, for each of the n time reference points recorded in step b), a set comprising zero or more grid elements, wherein the union of the n sets of grid elements has at least one grid element, and recording the n sets of grid elements in memory;
   further defining the candidate video-password by receiving from the user m input sets of grid elements including, for each of the m inputs received in step c)(ii), an input set comprising zero or more grid elements, wherein the union of the m input sets of grid elements has at least one grid element, and recording the m input sets of grid elements in memory; and
   determining if the candidate video-password matches the reference video-password further comprises determining if each of the input sets of grid elements of the candidate video-password matches the corresponding set of grid elements of the reference video-password.

4. The method as defined in claim 1 wherein the advertisement video further defines a video frame boundary, and the method further comprises:
   further defining the reference video-password by receiving from the user at least one click point, wherein each click point is associated with one of the n time reference points recorded in step b) and designates a location within the video frame boundary, and recording the at least one click point in memory;
   further defining the candidate video-password by receiving from the user at least one input click point, wherein each input click point is associated with one of the m inputs received in step c)(ii) and designates a location within the video frame boundary, and recording the at least one input click point in memory; and
   determining if the candidate video-password matches the reference video-password further comprises determining if each of the at least one input click point of the candidate video-password matches the corresponding click point of the reference video-password, by comparing the location designated by the input click point of the candidate video-password with the location designated by the corresponding click point of the reference video-password.

5. The method as defined in claim 4, wherein an input click point of the candidate video-password matches the corresponding click point of the reference video-password if and only if the location designated by the input click point of the candidate video-password is within a pre-defined pixel tolerance interval of the location designated by the corresponding click point of the reference video-password, and do not match otherwise, wherein the pre-defined pixel tolerance interval is between 3 and 50 pixels, inclusive.

6. The method as defined in claim 1, wherein the method further comprises:
   further defining the reference video-password by receiving from the user at least one tag phrase, wherein each tag phrase is associated with one of the n time reference points recorded in step b), and recording the at least one tag phrase in memory, wherein each tag phrase includes at least one symbol;
   further defining the candidate video-password by receiving from the user at least one input tag phrase, wherein each input tag phrase is associated with one of the m inputs received in step c)(ii), and recording the at least one input tag phrase in memory, wherein each input tag phrase includes at least one symbol; and
   determining if the candidate video-password matches the reference video-password further comprises determining if each of the at least one input tag phrase of the candidate video-password matches the corresponding tag phrase of the reference video-password, by comparing the at least one symbol of the input tag phrase of the candidate video-password with the at least one symbol of the tag phrase of the reference video-password.

7. The method as defined in claim 6, wherein each of the at least one symbol is a combination of symbols.

8. The method as defined in claim 6, wherein each symbol is a word.

9. The method as defined in claim 7, wherein each symbol is a word.

10. The method as defined in claim 4, wherein the method further comprises:
further defining the reference video-password by receiving from the user at least one tag phrase, wherein each tag phrase is associated with one of the n time reference points recorded in step b), and recording the at least one tag phrase in memory, wherein each tag phrase includes at least one symbol;
further defining the candidate video-password by receiving from the user at least one input tag phrase, wherein each input tag phrase is associated with one of the m inputs received in step c)(ii), and recording the at least one input tag phrase in memory, wherein each input tag phrase includes at least one symbol; and
determining if the candidate video-password matches the reference video-password further comprises determining if each of the at least one input tag phrase of the candidate video-password matches the corresponding tag phrase of the reference video-password, by comparing the at least one symbol of the input tag phrase of the candidate video-password with the at least one symbol of the tag phrase of the reference video-password.

11. A system for authenticating a user, the system comprising:
a hardware processor unit; and
a display unit in electronic communication with the hardware processor unit, the hardware processor unit being configured for:
a) displaying an advertisement video to the user on the display unit, wherein the advertisement video defines a video time duration vector and comprises a sequence of video frames during the video time duration vector;
b) defining a reference video-password by receiving from the user n time reference points, n being a positive integer, and recording the n time reference points in a memory of the system, wherein each time reference point indicates a relative position within the video time duration vector;
c) subsequently authenticating the user by
i) displaying the advertisement video on the display unit for viewing by the user;
ii) receiving from the user m inputs during (i), m being a positive integer, wherein each input is entered by the user through an input device;
iii) determining m input time reference points, by determining, for each of the m inputs an associated time reference point that is related to the time reference point of the video frame that is on the display unit when the user enters the input;
iv) defining a candidate video-password by recording the m input time reference points determined in (iii) in the memory;
v) determining if the candidate video-password matches the reference video-password by
determining if the number of time reference points of the reference video-password is equal to the number of input time reference points of the candidate video-password and each of the time reference points of the reference video-password is within a pre-defined time tolerance interval of the corresponding input time reference point of the candidate video-password; and
vi) authenticating the user if and only if the candidate video-password matches the reference video-password, and otherwise indicating failed authentication.

12. The system as defined in claim 11, wherein the pre-defined time tolerance interval is between 0.2 seconds to 2 seconds, inclusive.

13. The system as defined in claim 11, wherein the advertisement video further comprises a video location grid defining a plurality of grid elements, and the processor is further configured to perform the steps of:
further defining the reference video-password by receiving from the user n sets of grid elements, the n sets of grid elements including, for each of the n time reference points recorded in step b), a set comprising zero or more grid elements, wherein the union of the n sets of grid elements has at least one grid element, and recording the n sets of grid elements in memory;
further defining the candidate video-password by receiving from the user m input sets of grid elements including, for each of the m inputs received in step c)(ii), an input set comprising zero or more grid elements, wherein the union of the m input sets of grid elements has at least one grid element, and recording the m input sets of grid elements in memory; and
determining if the candidate video-password matches the reference video-password further comprises determining if each of the input sets of grid elements of the candidate video-password matches the corresponding set of grid elements of the reference video-password.

14. The system as defined in claim 11 wherein the advertisement video further defines a video frame boundary, and the processor is further configured to perform the steps of:
further defining the reference video-password by receiving from the user at least one click point, wherein each click point is associated with one of the n time reference points recorded in step b) and designates a location within the video frame boundary, and recording the at least one click point in memory;
further defining the candidate video-password by receiving from the user at least one input click point, wherein each input click point is associated with one of the m inputs received in step c)(ii) and designates a location within the video frame boundary, and recording the at least one input click point in memory; and
determining if the candidate video-password matches the reference video-password further comprises determining if each of the at least one input click point of the candidate video-password matches the corresponding click point of the reference video-password, by comparing the location designated by the input click point of the candidate video-password with the location designated by the corresponding click point of the reference video-password.

15. The system as defined in claim 14, wherein an input click point of the candidate video-password matches the corresponding click point of the reference video-password if and only if the location designated by the input click point of the candidate video-password is within a pre-defined pixel tolerance interval of the location designated by the corresponding click point of the reference video-password, and do not match otherwise, wherein the pre-defined pixel tolerance interval is between 3 and 50 pixels, inclusive.

16. The system as defined in claim 11, wherein the processor is further configured to perform the steps of:
further defining the reference video-password by receiving from the user at least one tag phrase, wherein each tag phrase is associated with one of the n time reference points recorded in step b), and recording the at least one tag phrase in memory, wherein each tag phrase includes at least one symbol;

further defining the candidate video-password by receiving from the user at least one input tag phrase, wherein each input tag phrase is associated with one of the m inputs received in step c)(ii), and recording the at least one input tag phrase in memory, wherein each input tag phrase includes at least one symbol; and determining if the candidate video-password matches the reference video-password further comprises determining if each of the at least one input tag phrase of the candidate video-password matches the corresponding tag phrase of the reference video-password, by comparing the at least one symbol of the input tag phrase of the candidate video-password with the at least one symbol of the tag phrase of the reference video-password.

17. The system as defined in claim 16, wherein each of the at least one symbol is a combination of symbols.

18. The system as defined in claim 16, wherein each symbol is a word.

19. The system as defined in claim 14, wherein the processor is further configured to perform the steps of:

further defining the reference video-password by receiving from the user at least one tag phrase, wherein each tag phrase is associated with one of the n time reference points recorded in step b), and recording the at least one tag phrase in memory, wherein each tag phrase includes at least one symbol;

further defining the candidate video-password by receiving from the user at least one input tag phrase, wherein each input tag phrase is associated with one of the m inputs received in step c)(ii), and recording the at least one input tag phrase in memory, wherein each input tag phrase includes at least one symbol; and determining if the candidate video-password matches the reference video-password further comprises determining if each of the at least one input tag phrase of the candidate video-password matches the corresponding tag phrase of the reference video-password, by comparing the at least one symbol of the input tag phrase of the candidate video-password with the at least one symbol of the tag phrase of the reference video-password.

20. A computer program product for use on a computer system for authenticating a user, the computer program product comprising: a non-transitory recording medium; instructions recorded on the non-transitory recording medium for instructing the computer system, the instructions for:

a) displaying an advertisement video to the user, wherein the advertisement video defines a video time duration vector and comprises a sequence of video frames during the video time duration vector;

b) defining a reference video-password by receiving from the user n time reference points, n being a positive integer, and recording the n time reference points in a memory of the system, wherein each time reference point indicates a relative position within the video time duration vector;

c) subsequently authenticating the user by
   i) displaying the advertisement video on a display for viewing by the user;
   ii) receiving from the user m inputs during (i), m being a positive integer, wherein each input is entered by the user through an input device;
   iii) determining m input time reference points, by determining, for each of the m inputs an associated time reference point that is related to the time reference point of the video frame that is on the display when the user enters the input;
   iv) defining a candidate video-password by recording the m input time reference points determined in (iii) in the memory;
   v) determining if the candidate video-password matches the reference video-password by
   determining if the number of time reference points of the reference video-password is equal to the number of input time reference points of the candidate video-password and each of the time reference points of the reference video-password is within a pre-defined time tolerance interval of the corresponding input time reference point of the candidate video-password; and
   vi) authenticating the user if and only if the candidate video-password matches the reference video-password, and otherwise indicating failed authentication.

* * * * *